US012117619B1

(12) United States Patent
Casarez et al.

(10) Patent No.: US 12,117,619 B1
(45) Date of Patent: Oct. 15, 2024

(54) HEAD MOUNTED DEVICE AND CAMERA MODULE

(71) Applicant: Meta Platforms Technologies, LLC, Menlo Park, CA (US)

(72) Inventors: Theresa Loney Casarez, Seattle, WA (US); Jiang Ai, Issaquah, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 336 days.

(21) Appl. No.: 17/465,065

(22) Filed: Sep. 2, 2021

Related U.S. Application Data

(60) Provisional application No. 63/236,127, filed on Aug. 23, 2021.

(51) Int. Cl.
| | | |
|---|---|---|
| *G01J 5/12* | (2006.01) | |
| *G01J 5/02* | (2022.01) | |
| *G02B 27/01* | (2006.01) | |
| *H04N 23/611* | (2023.01) | |
| *G06F 3/01* | (2006.01) | |
| *G06V 40/16* | (2022.01) | |

(52) U.S. Cl.
CPC ....... *G02B 27/0176* (2013.01); *H04N 23/611* (2023.01); *G02B 2027/0138* (2013.01); *G06F 3/011* (2013.01); *G06V 40/174* (2022.01)

(58) Field of Classification Search
CPC ........ G02B 27/0176; G02B 2027/0138; H04N 23/611; G06V 40/174; G06F 3/011
See application file for complete search history.

(56) References Cited

U.S. PATENT DOCUMENTS

| | | | | |
|---|---|---|---|---|
| 5,856,811 | A * | 1/1999 | Shih | G02B 27/0176 345/8 |
| 2011/0033179 | A1* | 2/2011 | Sasaki | G03B 17/00 396/427 |
| 2016/0062125 | A1* | 3/2016 | Baek | G02B 27/0176 361/679.01 |
| 2017/0371408 | A1* | 12/2017 | Wilson | A61B 5/6803 |
| 2019/0162950 | A1* | 5/2019 | Lapstun | H04N 13/243 |
| 2021/0007607 | A1* | 1/2021 | Frank | A61B 5/14552 |
| 2021/0191236 | A1* | 6/2021 | Schwab | H04N 5/772 |

* cited by examiner

*Primary Examiner* — Kwang-Su Yang
(74) *Attorney, Agent, or Firm* — Freestone Intellectual Property Law PLLC; Aaron J. Visbeek

(57) ABSTRACT

Devices and camera modules are configured for imaging facial gestures. The imaging may be directed at lower face imaging. The camera modules may be disposed along outside surfaces of devices such as head mounted devices to have a field of view that images a lower face region.

14 Claims, 9 Drawing Sheets

HEAD MOUNTED DEVICE AND CAMERA MODULE

CROSS-REFERENCE TO RELATED APPLICATIONS

This application claims priority to U.S. provisional Application No. 63/236,127 filed Aug. 23, 2021, which is hereby incorporated by reference

TECHNICAL FIELD

This disclosure relates generally to optics, and in particular to imaging.

BACKGROUND INFORMATION

Camera modules are included in smartphones, televisions, laptops, and other devices to capture images. Camera modules typically include an image sensor and one or more lenses configured to focus visible image light onto the image sensor. A display of the device may then present the image to a user of the device.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
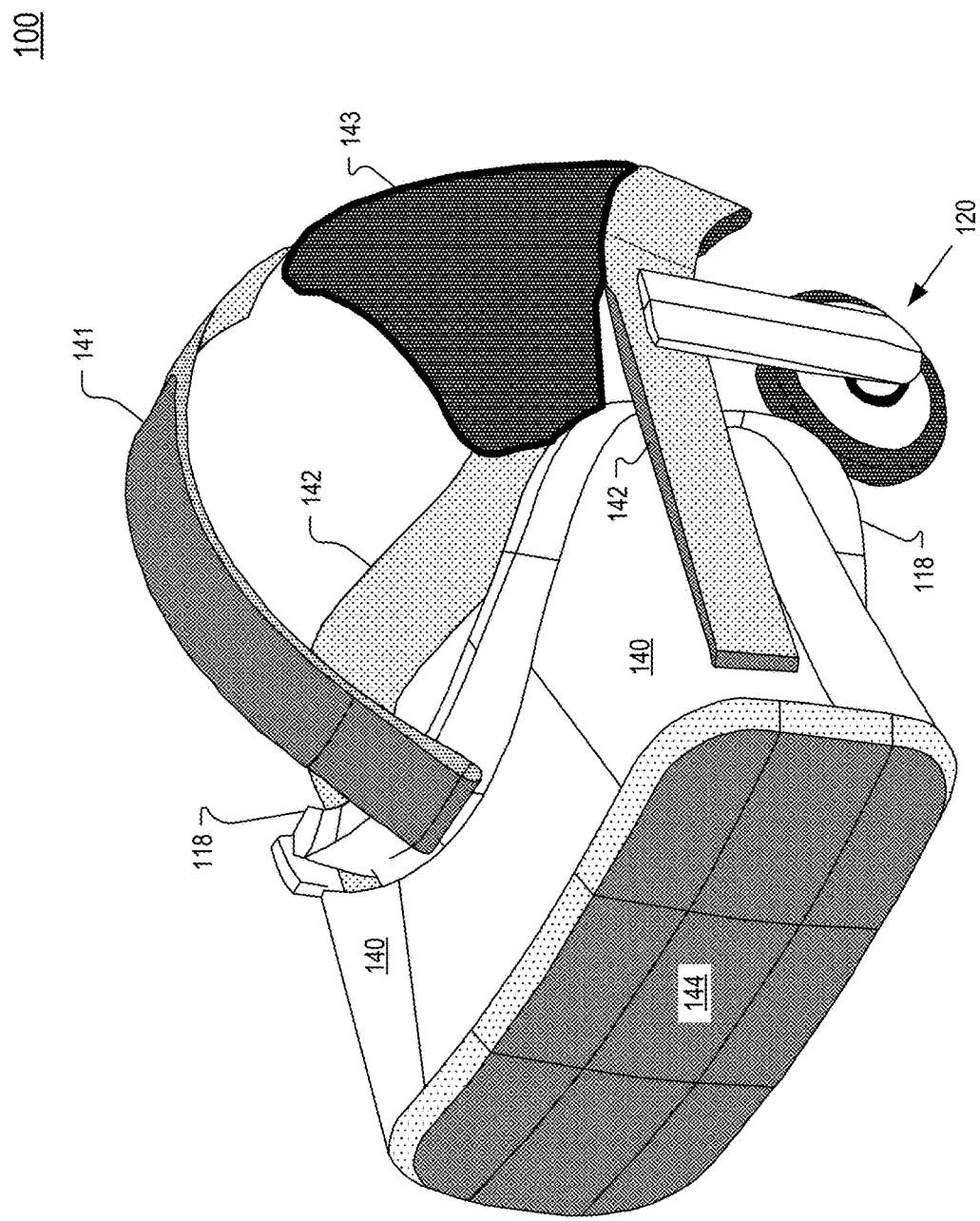
FIG. 1 is a perspective view of a head mounted display (HMD) configured for imaging facial gestures, in accordance with an implementation of the disclosure.

Embodiments of imaging facial gestures are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementation.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 μm.

In aspects of this disclosure, the term "transparent" may be defined as having greater than 90% transmission of light. In some aspects, the term "transparent" may be defined as a material having greater than 90% transmission of visible light.

Head mounted devices such as augmented reality (AR) or virtual reality (VR) headsets present virtual images to users. Head mounted devices are configured to be worn on or about a head of a user and head mounted devices may optionally include a display such that the head mounted device is considered a head mounted display (HMD). In some head mounted devices, cameras have been included to capture images of the external environment of the head mounted device. Recently, cameras have been included in head mounted devices to image the eye of a user. Imaging the eye of a user may allow the user to interact with virtual images or control an operation of the head mounted device.

Facial gestures by a user may also increase interaction with a device or a community using a head mounted device. By way of example, imaging facial gestures may allow real-time animation of a user's facial gesture to be shared with other users. For example, an avatar of a user of a head mounted device may be animated to smile in response to imaging a user that is smiling. Of course, other facial gestures can be translated into animation of an avatar. Furthermore, imaging facial gestures may allow for other interactions and may also be used as an input to control the operation of a head mounted device.

Implementations of the disclosure include camera modules that may be configured for imaging facial gestures. In an implementation, a lower-face imaging camera is included in a head mounted device. In some implementations, the head mounted device includes a display for presenting virtual images to users of the device and the head mounted device is considered an HMD. The lower-face imaging camera module may be configured to image a lower face region that includes a lip region, a chin region, and/or a lower-nose region. Imaging the lip, chin, and/or lower-nose region may assist in determining facial gestures. The lower-face imaging camera module may be located on an outside-bottom surface of a head mounted device to orient the camera module to have a field-of-view (FOV) that includes the lower face region. In some implementations, non-visible light sources (e.g. infrared light sources) emit non-visible illumination light to illuminate the lower face region and the lower-face imaging camera module is configured to image the wavelength of the non-visible light. In some implementations, more than one lower-face imaging camera modules may be used to image the facial gestures.

In an implementation, a head mounted devices includes a transparent cover that covers a camera of the head mounted device. A total internal reflection (TIR) suppression bracket is included in the head mounted device where the TIR suppression bracket is angled with respect to the transparent cover to reflect image light incident onto the TIR suppression bracket at a reflection angle that exits the transparent cover without the transparent cover confining reflected image light by way of TIR. This reduces optical noise (that may cause ghost images) from entering the camera of the head mounted device. In some implementations, the TIR suppression bracket also prevents dust from contacting the camera. In some implementations, an energy-absorbing mechanical structure is coupled to support an image sensor and a lens assembly of a camera module and the energy-absorbing mechanical structure is configured to be secured to a chassis of the head mounted device. These and other embodiments are described in more detail in connection with FIGS. 1-5B.

FIG. 1 is a perspective view of a head mounted display (HMD) 100 configured for imaging facial gestures, in accordance with an implementation of the disclosure. The illustrated example of HMD 100 is shown as including a viewing structure 140 including a front rigid body 144, a top securing structure 141, a side securing structure 142, and a rear securing structure 143. In some examples, the HMD 100 is configured to be worn on a head of a user of the HMD 100, where the top securing structure 141, side securing structure 142, and/or rear securing structure 143 may include a fabric strap including elastic as well as one or more rigid structures (e.g., plastic) for securing the HMD 100 to the head of the user. HMD 100 may also optionally include one or more earpieces 120 for delivering audio to the ear(s) of the user of the HMD 100.

The illustrated example of HMD 100 also includes an interface membrane 118 for contacting a face of the user of the HMD 100, where the interface membrane 118 functions to block out at least some ambient light from reaching to the eyes of the user of the HMD 100.

Example HMD 100 may also include a chassis for maintaining mechanical structures of HMD 100 and for supporting hardware of the viewing structure 140 of HMD 100 (chassis and hardware not explicitly illustrated in FIG. 1). The hardware of viewing structure 140 may include any of processing logic, wired and/or wireless data interface for sending and receiving data, graphic processors, and one or more memories for storing data and computer-executable instructions. In one example, viewing structure 140 may be configured to receive wired power and/or may be configured to be powered by one or more batteries. In addition, viewing structure 140 may be configured to receive wired and/or wireless data including video data.

Viewing structure 140 may also include a display system having one or more electronic displays for directing image light to the eye(s) of a user of HMD 100 to present a virtual image to the user. The display system may include one or more of an LCD, an organic light emitting diode (OLED) display, or micro-LED display for emitting image light (e.g., content, images, video, etc.) to a user of HMD 100.

Figure 2A:
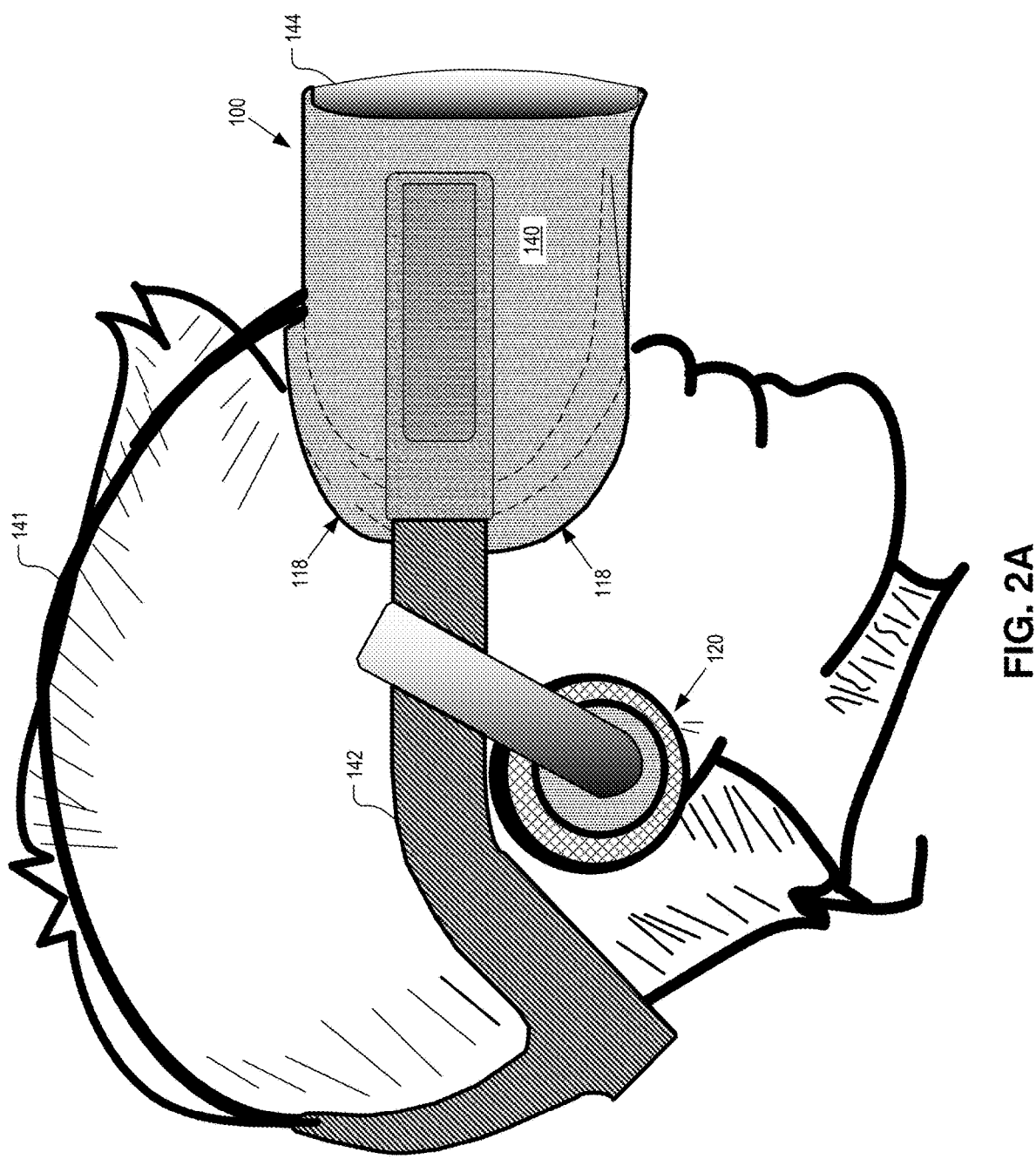
FIGS. 2A-2C illustrate a user wearing an HMD that includes a lower-face imaging camera module for imaging facial gestures, in accordance with aspects of the disclosure.
Figure 2B:
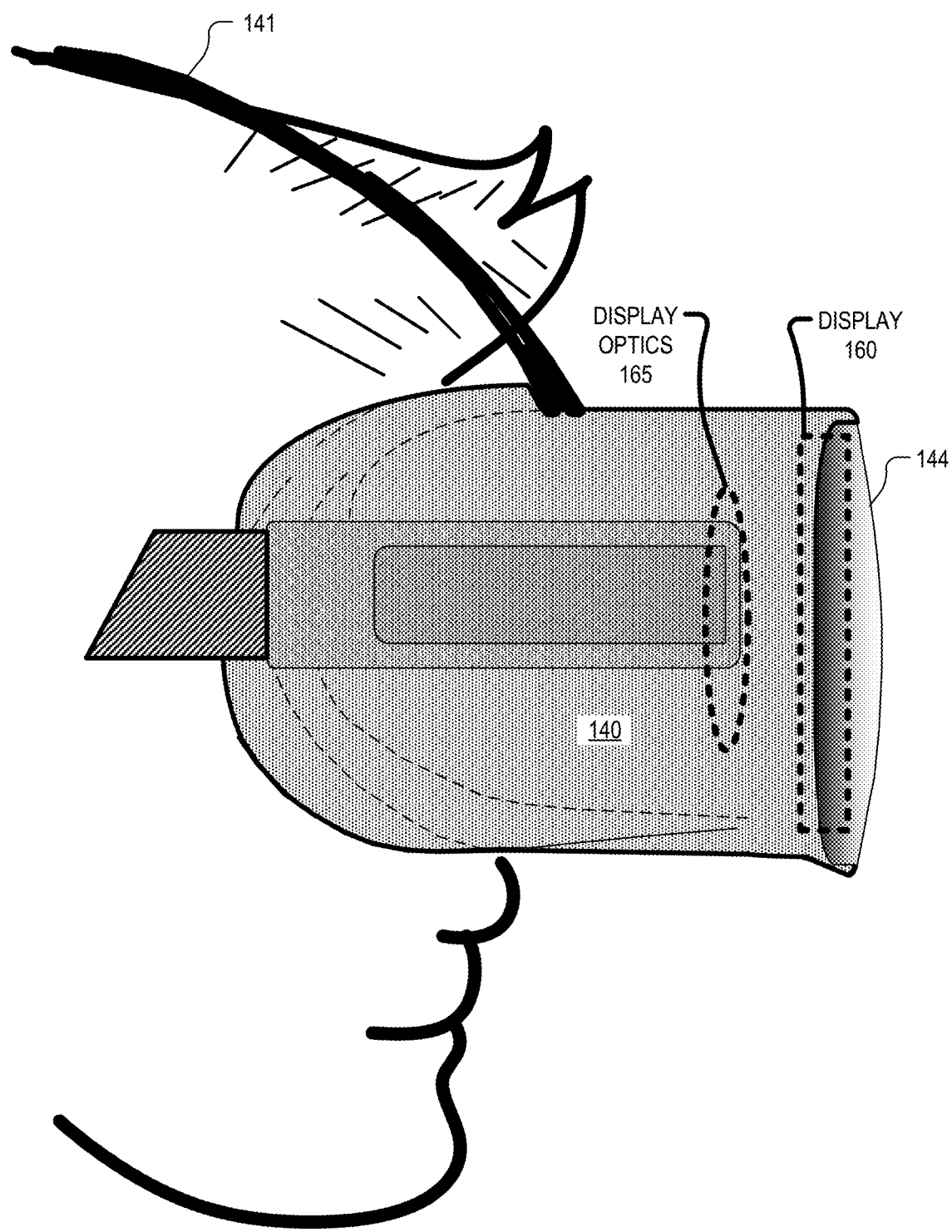
Figure 2C:
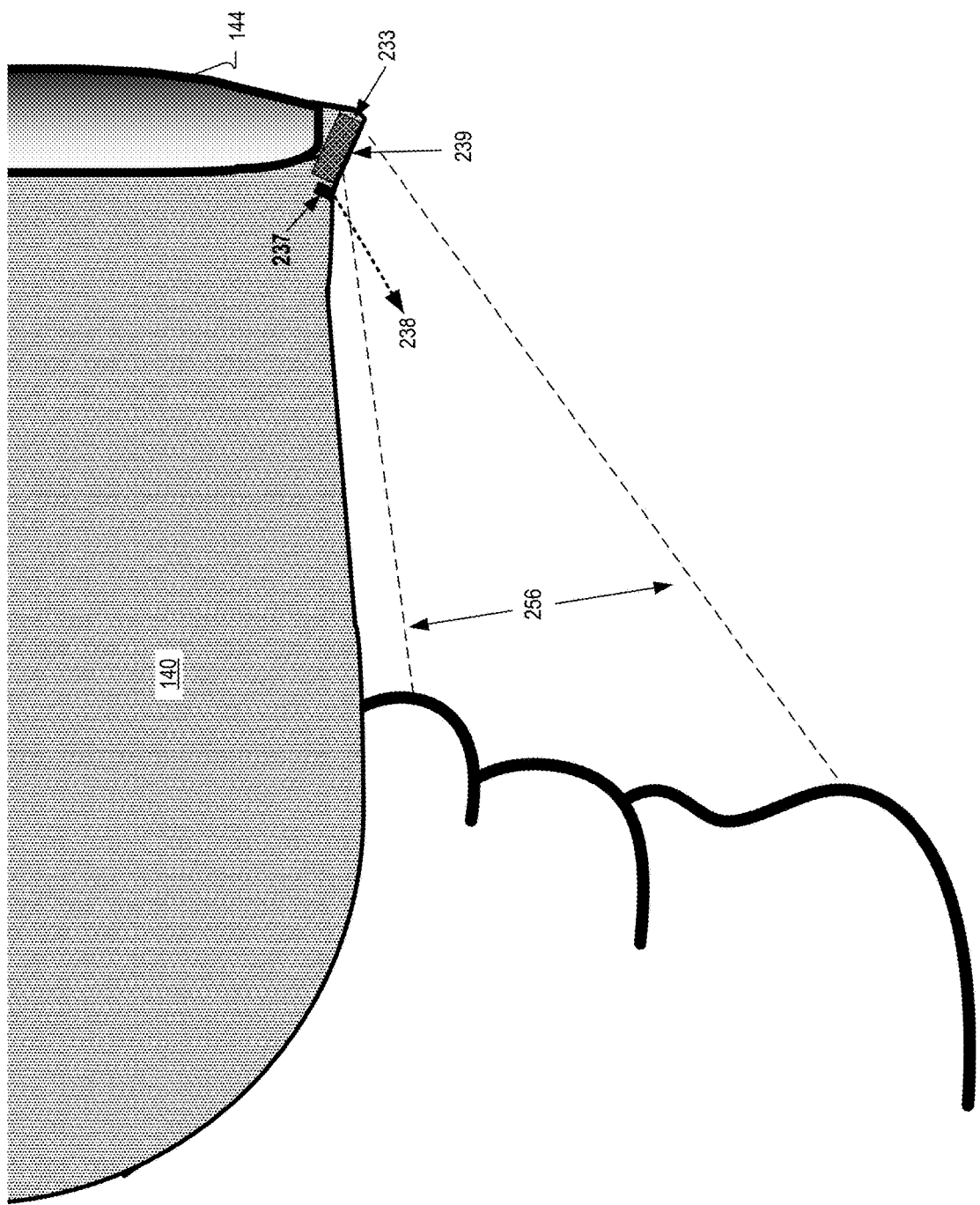

FIGS. 2A-2C illustrate a user wearing HMD 100 that includes a lower-face imaging camera module for imaging facial gestures, in accordance with implementations of the disclosure. FIG. 2A illustrates a user wearing HMD 100 so that the user can view virtual images presented by HMD 100. FIG. 2B illustrates example placement of a display 160 and display optics 165 that may be configured to focus virtual images to the eye of the user.

FIG. 2C illustrates a zoomed-in view of FIG. 2B that includes a lower-face imaging camera module 233 configured to image a lower face region of a user in a FOV 256 of lower-face imaging camera module 233. Lower-face imaging camera module 233 may include an image sensor and a lens assembly configured to focus image light onto the image sensor. The image sensor may be a complementary metal-oxide semiconductor (CMOS) image sensor, for example.

HMD 100 may include a plurality of lower-face imaging camera modules 233, in some implementations. In the illustrated implementation, lower-face imaging camera module 233 is located at an outside-bottom surface 239 of the viewing structure 140 of HMD 100. This may provide the lower-face imaging camera module 233 the required angle to image the lower face region of a wearer of HMD 100. Outside-bottom surface 239 may be tilted down and facing the lower face region when a user has HMD 100 positioned to view the virtual images presented on the display, as illustrated in FIG. 2C.

A lens assembly of lower-face imaging camera module 233 may have a focus distance between 0.5 cm and 5 cm to allow the lens assembly to focus features of the lower face region (e.g. lips, chin, and/or nose) to the image sensor of lower-face imaging camera module 233. In some implementations, the lens assembly has a focus distance of between 0.5 cm and 10 cm. In some implementations, the lens assembly has a focus distance of between 2.5 cm and 10 cm. In an implementation, the lens assembly has a focus distance between 16 mm and 40 mm.

FIG. 2C also illustrates that a non-visible light source 237 may be oriented to emit non-visible illumination light 238 to illuminate the lower face region. The non-visible light source 237 may be an LED, micro-LED, vertical-cavity side-emitting laser (VCSEL), or other suitable light source. The non-visible light source 237 may emit infrared light. The non-visible light source may emit near-infrared light. The lower-face imaging camera module 233 may be configured to image a near-infrared wavelength band of the near-infrared light and a filter of the lower-face imaging camera module may be configured to block wavelengths outside the near-infrared wavelength band from becoming incident on an image sensor of the lower-face imaging camera module 233. For example, non-visible light source 237 may be configured to emit near-infrared light centered around 940 nm and the filter of lower-face imaging camera module 233 may be configured to transmit light having a wavelength between 935 nm and 945 while rejecting (blocking) other wavelengths.

Figure 3A:
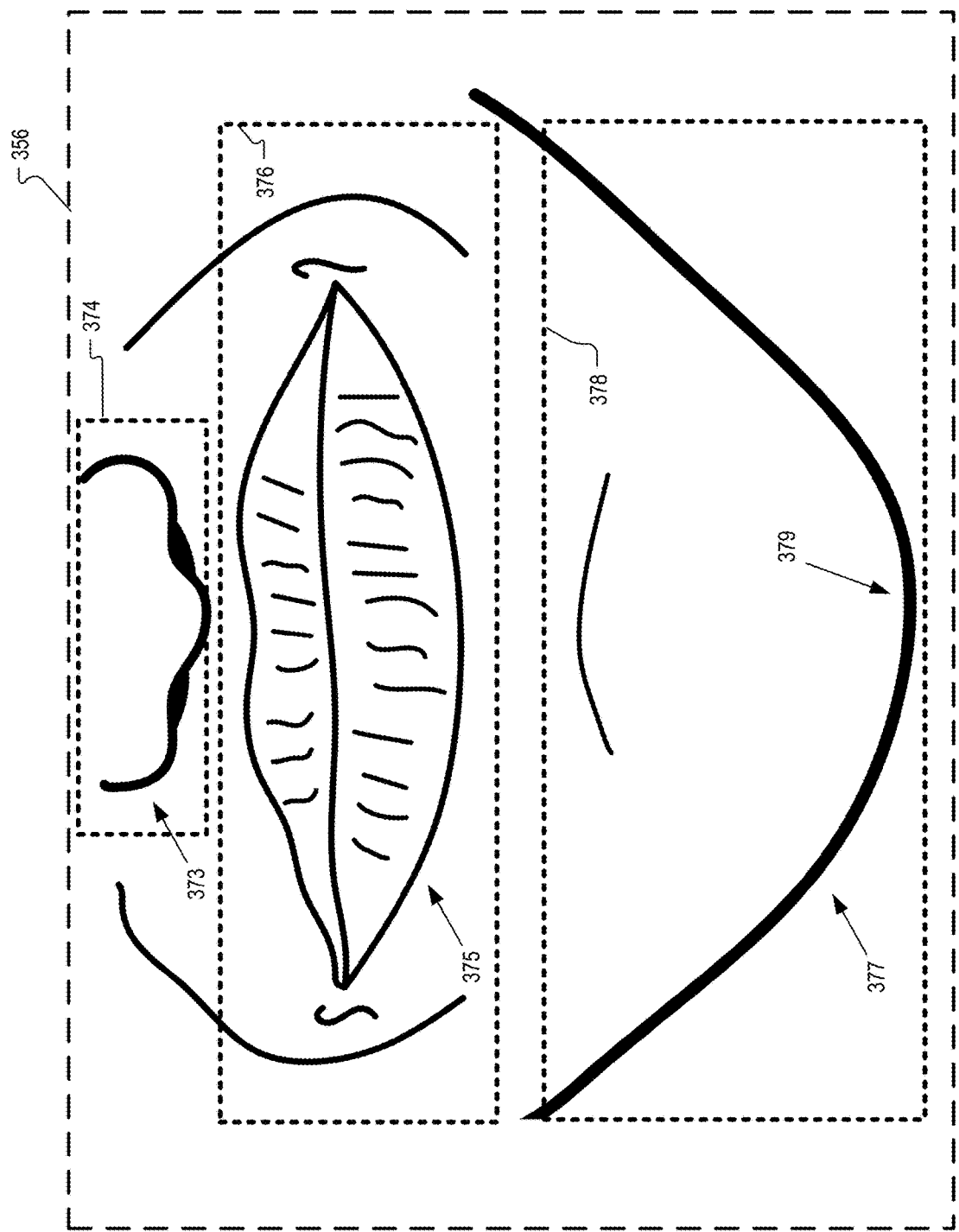
FIGS. 3A-3C illustrate an example lower face region that may be imaged by a lower-face imaging camera module, in accordance with aspects of the disclosure.

FIG. 3A illustrates an example lower face region 356 that may be imaged by lower-face imaging camera module 233, in accordance with implementations of the disclosure. Hence, lower face region 356 may be an example of what is in FOV 256 of lower-face imaging camera module 233. Example lower face region 356 includes a lower-nose region 374, a lip region 376, and a chin region 378. These regions may overlap in some implementations. HMD 100 may cover an upper face region of a user (e.g. above lower-nose region 374) so imaging the lower face region 356 may be particularly important for determining facial gestures of a user. For example, an upper-nose region above lower-nose region 374 may be outside FOV 256 and thus outside of lower face region 356.

Lip region 376 may include a region where lips 375 of the user/wearer will occupy when a wearer of HMD 100 is wearing HMD 100 (or other head mounted device) on their head. Lip region 376 may include lips 375 of a user as well as areas around the lips so that smile lines, dimples, etc. can be imaged. Imaging lips 375, and surrounding skin may be important for detecting gestures or reactions of a user, for example. In the illustrated of FIG. 3A, chin region 378 includes a region where a chin 377 of a user will occupy when the user is wearing HMD 100. Chin region 378 may extend from a bottom of chin 379 to a bottom of lips 375. In some implementations, lower face region 356 does not include chin region 378. In some implementations, lower face region 356 does not include lower-nose region 374 that includes a nose 373 of a user of HMD 100 (or other head mounted device). In some implementations, lower face region 356 does not include chin region 378.

Figure 3B:
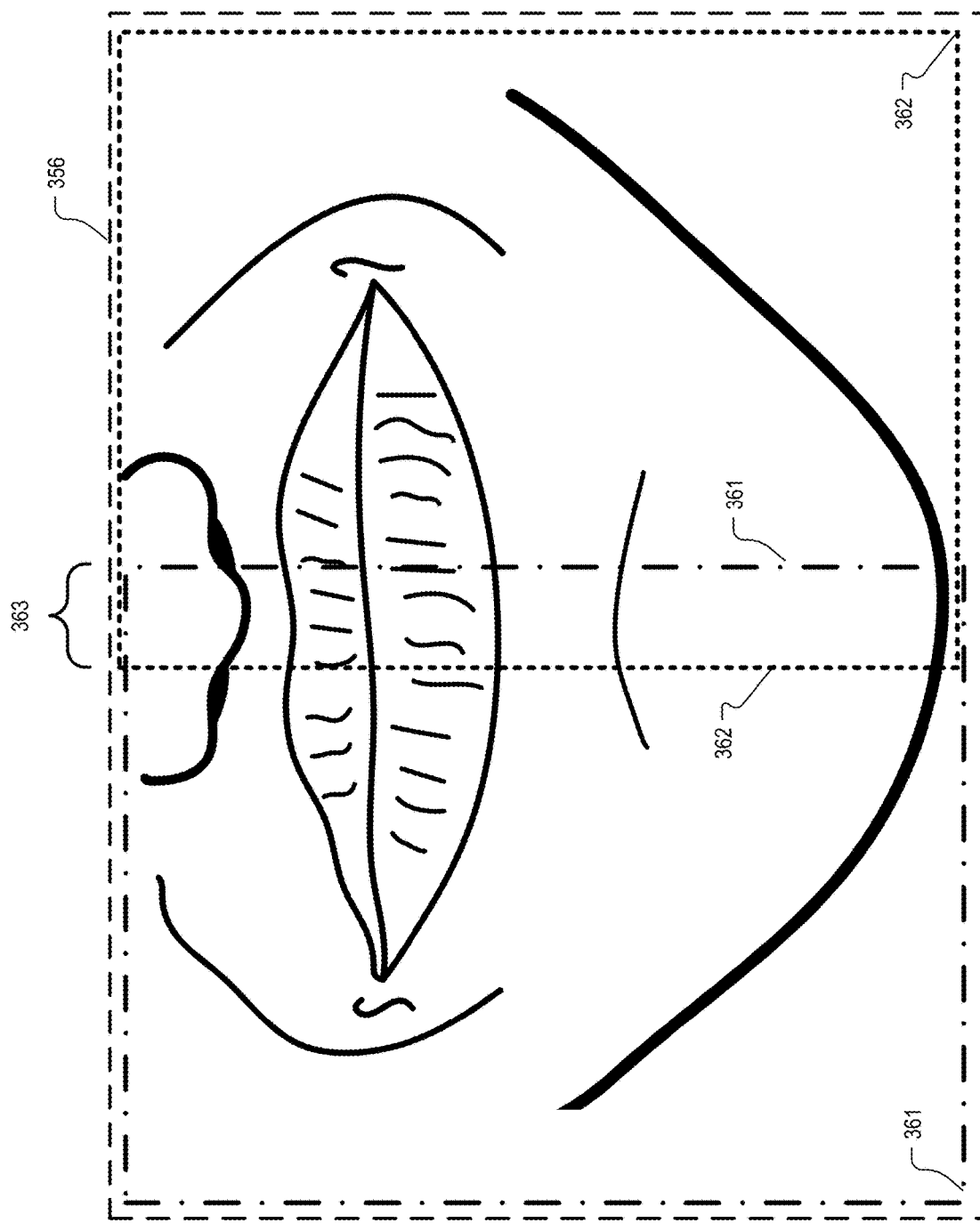

FIG. 3B illustrates that lower face region 356 may be imaged by more than one lower-face imaging camera module 233, in some implementation. By way of example, FIG. 3B illustrates that a first camera module may image a left side 361 of lower face region 356 and a second camera module may image a right side 362 of lower face region 356. Left side 361 of lower face region 356 is depicted with a dash-dot line and right side 362 of lower face region 356 is depicted with a mini dash line, in FIG. 3B. In the illustrated example, left side 361 of lower face region 356 overlaps right side 362 of lower face region 356 in overlapping region 363. In other implementations, more than two lower-face imaging camera modules may image lower face region 356.

Figure 3C:
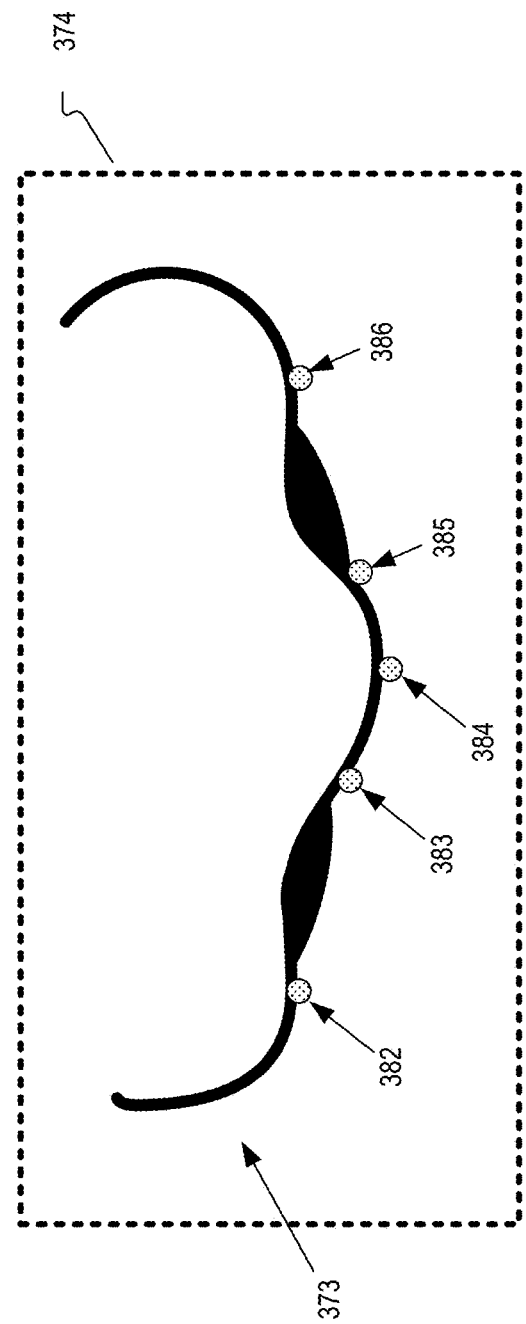

FIG. 3C illustrates a larger view of lower-nose region 374, in accordance with implementations of the disclosure. FIG. 3C illustrates points 382, 383, 384, 385, and 386 as example anchor points to assist in image analysis of lower-nose region 374.

Figure 4:
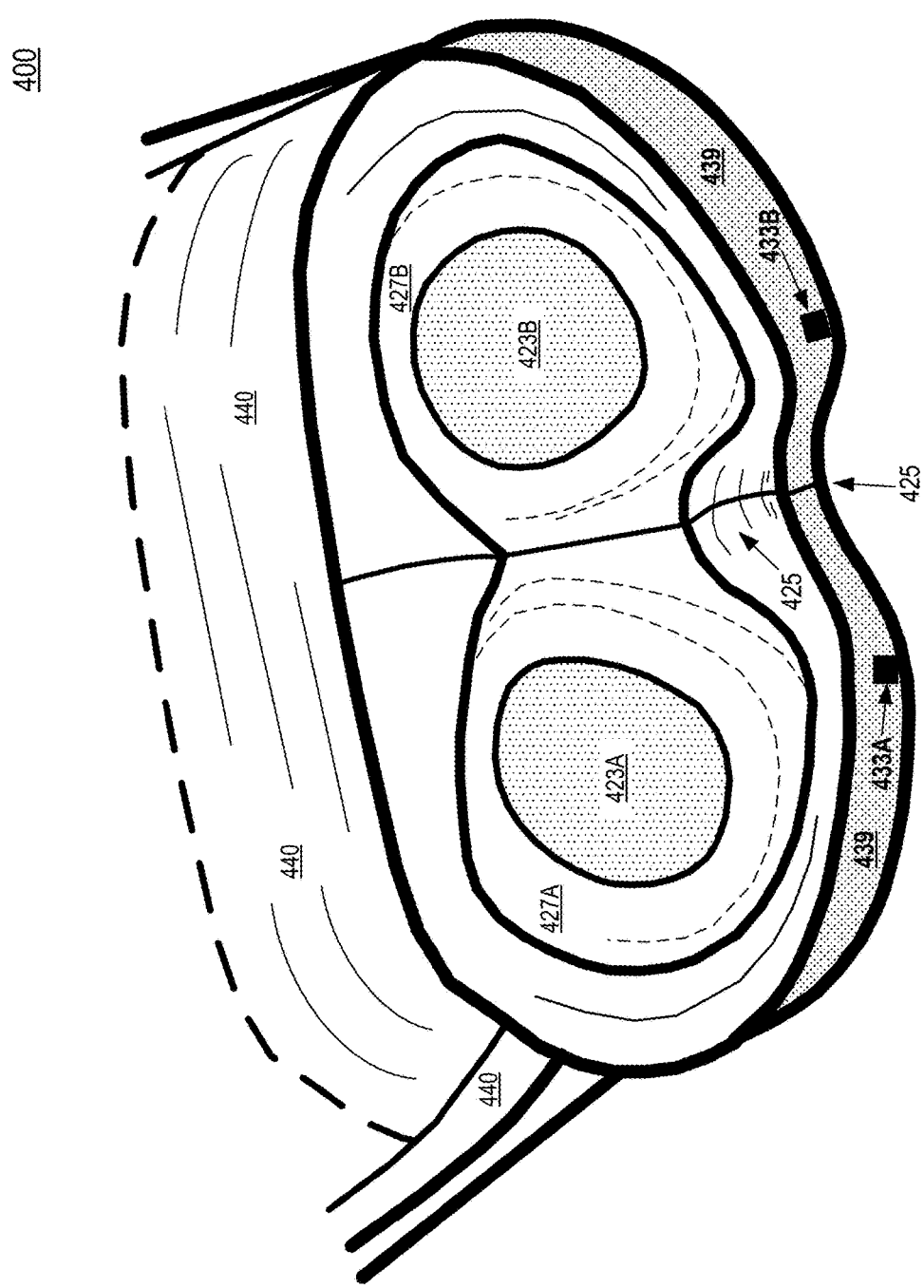
FIG. 4 illustrates an interior view of an example HMD that includes a first lower-face imaging camera module and a second lower-face imaging camera module, in accordance with aspects of the disclosure.

FIG. 4 illustrates an interior view of example HMD 400 that includes a first lower-face imaging camera module 433A and a second lower-face imaging camera module 433B, in accordance with implementations of the disclosure. First lower-face imaging camera module 433A may be configured to image left side 361 of lower face region 356 and second lower-face imaging camera module 433B may be configured to image right side 362 of lower face region 356, for example. In the illustration of FIG. 4, first lower-face imaging camera module 433A and second lower-face imaging camera module 433B are disposed on an outside-bottom surface 439 of the viewing structure 440 of HMD 400. This may provide the lower-face imaging camera modules 433 (referring to modules 433A and 433B collectively) the required angle to image the lower face region of a wearer of HMD 400. Outside-bottom surface 439 may be tilted down and facing the lower face region when a user has HMD 400 positioned to view the virtual images presented on the display.

The interior view of HMD 400 illustrates that display optical elements 423A and 423B that are configured to focus virtual images presented by a display (not specifically illustrated in FIG. 4). Display optical elements 423A and 423B are surrounded by eyecups 427A and 427B, respectively. Eyecups 427A and 427B may be configured to block out ambient light from eyes of a user wearing HMD 400, for example. In FIG. 4, a nose void 425 of viewing structure 440 is disposed between first lower-face imaging camera module 433A and second lower-face imaging camera module 433B so that a nose of a wearer does not occlude (or reduces occlusions of) lower face region 356. In implementations of the disclosure, non-visible light sources (e.g. similar to light source 237) may be disposed near each lower-face imaging camera module 433 to illuminate lower face region 356 with non-visible illumination light.

Figure 5B:
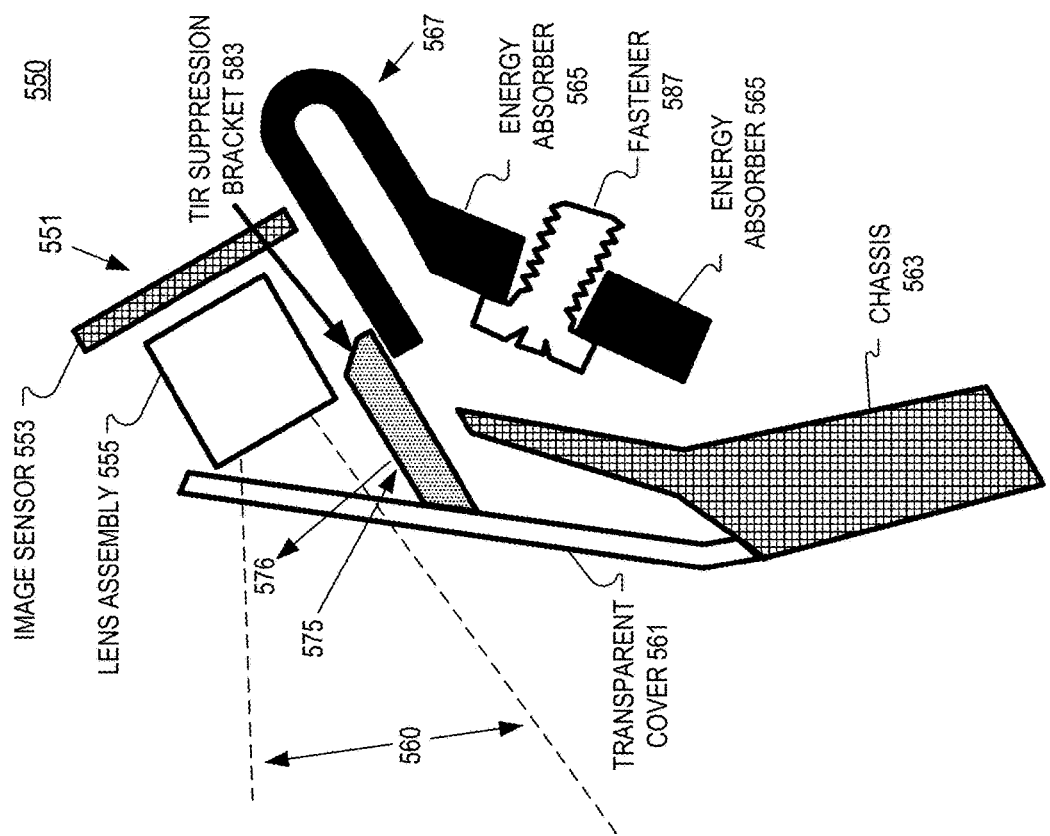
FIG. 5B illustrates an example configuration of a camera module of a head mounted device, in accordance with aspects of the disclosure.
Figure 5A:
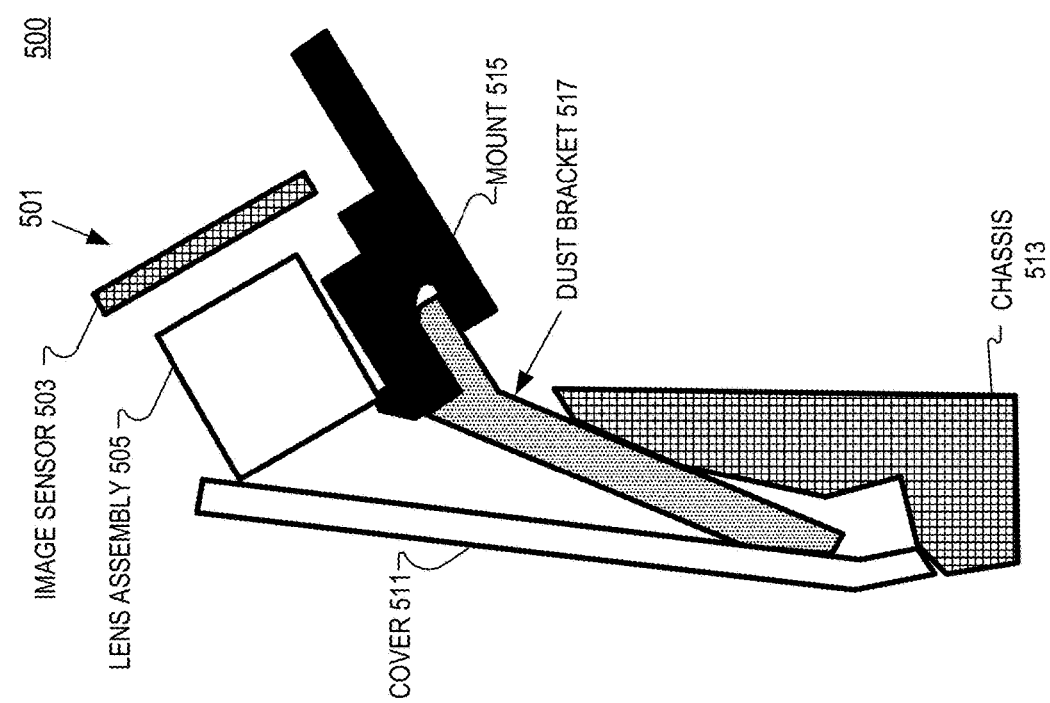
FIG. 5A illustrates an example configuration of a camera module of a head mounted device.

FIG. 5A illustrates an example configuration 500 of a camera module of a head mounted device. Configuration 500 includes a camera module 501 that includes a lens assembly 505 and an image sensor 503. Camera module 501 is mounted to mount 515. Electrical components of camera module 501 may be routed to a printed circuit board (PCB) or a flex circuit of mount 515. Dust bracket 517 is coupled to chassis 513 of the head mounted device. Dust bracket 517 prevents dust from encountering camera module 501 and, in particular, prevents dust from entering the space between cover 511 and lens assembly 505 so that dust or other contaminants do not encounter the imaging optical path of camera module 501.

FIG. 5B illustrates an example configuration 550 of a camera module 551 of a head mounted device, in accordance with implementations of the disclosure. Configuration 550 includes a camera module 551 that includes a lens assembly 555 and an image sensor 553. Lens assembly 555 is configured to focus image light from FOV 560 onto image sensor 553. Image sensor 553 may be configured to capture near-infrared images. Configuration 550 may be used in conjunction with the implementation described with respect to FIGS. 1-4.

Camera module 551 is mounted to energy-absorbing mechanical structure 565. Energy-absorbing mechanical structure 565 is coupled to support image sensor 553 and lens assembly 555. The energy-absorbing mechanical structure 565 is configured to be secured to chassis 563 of a viewing structure of the head mounted device. A fastener such as fastener 587 may secure energy-absorbing mechanical structure 565 to the chassis (not specifically illustrated as attached to fastener 587), for example.

In the illustration of FIG. 5B, energy-absorbing mechanical structure 565 includes a spring 567 to absorb impacts. Since camera module 551 may be mounted on a very outside edge/surface and/or a corner of the head mounted device (in order to get the appropriate angle to image facial gestures), energy-absorbing mechanical structure 565 may be particularly helpful to absorb mechanical shock rather than transferring the mechanical shock to the camera module 551. Dropping head mounted devices is one concerning source of potential mechanical shock, for example. Electrical components of camera module 551 may be routed to a printed circuit board (PCB) or a flex circuit of energy-absorbing mechanical structure 565.

Configuration 550 includes a transparent cover 561 secured to a viewing structure of the head mounted device by way of chassis 563. Lens assembly 555 is disposed between image sensor 553 and transparent cover 561. Total internal reflection (TIR) suppression bracket 583 is angled with respect to transparent cover 561 to reflect the image light (e.g. image light ray 575) incident onto TIR suppression bracket 583 at a reflection angle that exits transparent cover 561 without transparent cover 561 confining reflected image light 576 by way of TIR. In contrast, dust bracket 517 of FIG. 5A adds optical noise to images captured by image sensor 503 by reflecting incident image light at an angle conducive to cover 511 confining the reflected image light into a refractive material of cover 511. Since the reflected image light is then confined to cover 511 by TIR, cover 511 may act as a waveguide that transfers reflected image light into lens assembly 505 when the waveguided light escapes TIR by cover 511. This light that escapes TIR then is focused by lens assembly 505 onto image sensor 503, which adds optical noise (e.g. ghosting artifacts) to images generated by image sensor 503.

Energy-absorbing mechanical structure 565 is coupled to TIR suppression bracket 583, in FIG. 5B. TIR suppression bracket 583 is also coupled to chassis 563 of a device. Advantageously, in some implementations, TIR suppression bracket 583 is also configured to prevent dust from contacting lens assembly 555 and image sensor 553 (in addition to suppressing TIR). Transparent cover 561 may conform to the viewing structure of the head mounted device.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, BlueTooth, SPI (Serial Peripheral Interface), I2C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted device comprising:
   an image sensor configured to capture images;
   a lens assembly configured to focus image light onto the image sensor;
   a transparent cover secured to a viewing structure of the head mounted device, wherein the lens assembly is disposed between the image sensor and the transparent cover; and
   a total internal reflection (TIR) suppression bracket, wherein the TIR suppression bracket is angled with respect to the transparent cover to reflect the image light incident onto the TIR suppression bracket at a reflection angle that exits the transparent cover without the transparent cover confining reflected image light by way of TIR, and wherein the reflected image light is image light reflected by the TIR suppression bracket.

2. The head mounted device of claim 1, wherein the TIR suppression bracket is also configured to prevent dust from contacting the lens assembly and the image sensor.

3. The head mounted device of claim 1, wherein the transparent cover conforms to the viewing structure of the head mounted device.

4. The head mounted device of claim 1, wherein the image sensor is configured to capture near-infrared images.

5. The head mounted device of claim 1 further comprising:
an energy-absorbing mechanical structure coupled to support the image sensor and the lens assembly, wherein the energy-absorbing mechanical structure is configured to be secured to a chassis of the head mounted device.

6. The head mounted device of claim 5, wherein the energy-absorbing mechanical structure is coupled to the TIR suppression bracket.

7. A camera module for a head mounted device, the camera module comprising:
an image sensor;
a lens assembly configured to focus image light onto the image sensor; and
an energy-absorbing mechanical structure coupled to support the image sensor and the lens assembly, wherein the energy-absorbing mechanical structure is configured to be secured to a chassis of the head mounted device, wherein the energy-absorbing mechanical structure is coupled to a total internal reflection (TIR) suppression bracket.

8. The camera module of claim 7, wherein the energy-absorbing mechanical structure includes a spring.

9. The camera module of claim 7, wherein the camera module is configured for placement on an outside edge of the head mounted device.

10. The camera module of claim 7, wherein the energy-absorbing mechanical structure is configured to be secured to the chassis of the head mounted device by a fastener.

11. The camera module of claim 7, wherein the TIR suppression bracket is also coupled to the chassis of the head mounted device.

12. The camera module of claim 7, wherein the TIR suppression bracket is configured to reflect the image light incident onto the TIR suppression bracket at a reflection angle.

13. A camera module comprising:
an image sensor configured to capture images;
a lens assembly configured to focus image light onto the image sensor;
a transparent cover, wherein the lens assembly is disposed between the image sensor and the transparent cover; and
a total internal reflection (TIR) suppression bracket, wherein the TIR suppression bracket is angled with respect to the transparent cover to reflect the image light incident onto the TIR suppression bracket at a reflection angle that exits the transparent cover without the transparent cover confining reflected image light by way of TIR, and wherein the reflected image light is image light reflected by the TIR suppression bracket.

14. The camera module of claim 13, wherein the TIR suppression bracket is also configured to prevent dust from contacting the lens assembly and the image sensor.

* * * * *